United States Patent
Rosu

(10) Patent No.: US 11,054,226 B2
(45) Date of Patent: Jul. 6, 2021

(54) METHOD OF PREPARING AND APPLYING A SLURRY MIXTURE TO A BRIDGE WIRE INITIATOR

(71) Applicant: Ensign-Bickford Aerospace & Defense Company, Simsbury, CT (US)

(72) Inventor: Marius Rosu, Newbury Park, CA (US)

(73) Assignee: ENSIGN-BICKFORD AEROSPACE & DEFENSE COMPANY, Simsbury, CT (US)

( * ) Notice: Subject to any disclaimer, the term of this patent is extended or adjusted under 35 U.S.C. 154(b) by 507 days.

(21) Appl. No.: 15/921,193

(22) Filed: Mar. 14, 2018

(65) Prior Publication Data

US 2018/0283832 A1 Oct. 4, 2018

Related U.S. Application Data

(60) Provisional application No. 62/480,622, filed on Apr. 3, 2017.

(51) Int. Cl.
| | |
|---|---|
| *F42B 3/195* | (2006.01) |
| *B22F 1/00* | (2006.01) |
| *B22F 7/08* | (2006.01) |
| *C04B 35/58* | (2006.01) |
| *C04B 35/626* | (2006.01) |
| *C06B 33/06* | (2006.01) |
| *C06B 33/04* | (2006.01) |
| *C06B 43/00* | (2006.01) |
| *C06B 45/30* | (2006.01) |
| *C06C 7/00* | (2006.01) |
| *C04B 35/622* | (2006.01) |
| *C06C 7/02* | (2006.01) |
| *B22F 3/22* | (2006.01) |

(52) U.S. Cl.
CPC ............ *F42B 3/195* (2013.01); *B22F 1/0059* (2013.01); *B22F 3/22* (2013.01); *B22F 7/08* (2013.01); *C04B 35/58071* (2013.01); *C04B 35/62222* (2013.01); *C04B 35/62625* (2013.01); *C06B 33/04* (2013.01); *C06B 33/06* (2013.01); *C06B 43/00* (2013.01); *C06B 45/30* (2013.01); *C06C 7/00* (2013.01); *C06C 7/02* (2013.01); *C04B 2235/3813* (2013.01)

(58) Field of Classification Search
CPC ...................................................... F42B 3/195
See application file for complete search history.

(56) References Cited

U.S. PATENT DOCUMENTS

| | | | |
|---|---|---|---|
| 5,686,691 | A | 11/1997 | Hamilton et al. |
| 6,698,356 | B2 | 3/2004 | Rosu |
| 6,779,456 | B2 | 8/2004 | Avetisian |
| 6,905,661 | B2 | 6/2005 | Ryan, Jr. et al. |
| 6,941,867 | B2 | 9/2005 | Renz et al. |
| 7,004,071 | B2 | 2/2006 | Avetisian et al. |
| 8,573,123 | B1 * | 11/2013 | Fuchs ................ F42B 3/195 102/202.7 |
| 2007/0170382 | A1 * | 7/2007 | Li ................ F16K 31/122 251/5 |

* cited by examiner

*Primary Examiner* — Aileen B Felton
(74) *Attorney, Agent, or Firm* — Cantor Colburn LLP

(57) ABSTRACT

Embodiments of the present invention include a method for preparing and applying a slurry mixture to a bridge wire initiator which involves a slurry mixture that is relatively safer for a user to handle and in which the method is relatively less complex and shorter in duration for a user to prepare and apply the slurry mixture to the bridge wire initiator.

8 Claims, 3 Drawing Sheets

METHOD OF PREPARING AND APPLYING A SLURRY MIXTURE TO A BRIDGE WIRE INITIATOR

CROSS REFERENCE TO RELATED APPLICATIONS

This application claims the benefit of U.S. Provisional Application Ser. No. 62/480,622 filed Apr. 3, 2017, the entire disclosure of which is incorporated herein by reference.

BACKGROUND

The subject matter disclosed herein relates in general to a method for preparing and applying a slurry mixture containing an explosive or energetic material to a bridge wire type of initiator device, and in particular to such a method involving a slurry mixture that is relatively safer for a user to handle and in which the method is relatively less complex and shorter in duration for a user to prepare and apply the slurry mixture to the bridge wire initiator.

Various methods are known for preparing and applying a slurry mixture to a bridge wire initiator. These methods are typically extensive in both their scope and the amount of state-of-the-art knowledge in organic chemistry needed to select the raw materials and prepare the slurry mixture. The slurry mixture typically contains an energetic or explosive (e.g., pyrotechnic) material (e.g., zirconium potassium perchlorate—"ZPP") in powder form that is suspended in a liquid solvent. These ingredients are typically mixed in an open container. The user then "paints" or applies the slurry mixture to the bridge wire initiator while the slurry mixture is still "wet" or in liquid form. The bridge wire initiator is commonly used for space applications in which it is desired for the initiator to reliably perform over a relatively large temperature range of from −420° F. to +300° F., which is normally difficult to achieve. This type of method is also relatively highly dependent on operator and slurry mixture characteristics, which usually results in limited manufacturing reliability. Further, mixing the slurry mixture in, and applying the slurry mixture from, an open container is undesirable for the user in that the solvent tends to quickly evaporate and the slurry mixture thus tends to dry out, which may cause the slurry mixture to detonate or ignite prematurely if not handled properly.

Other known methods for preparing and applying a slurry mixture to a bridge wire initiator involve preparing a relatively high viscosity slurry mixture (e.g., greater than 1000 cP) and applying the slurry mixture to the bridge wire initiator in relatively large amounts (e.g., typically greater than 30 mg, or approximately 60 mg) using a positive displacement rotary pump. This type of method is commonly used for automotive initiator applications for use over a relatively smaller temperature range of from −40° F. to +160° F. This type of method, however, tends to create or leave unwanted voids in the slurry mixture.

What is needed is a method for reliably preparing and applying a slurry mixture containing an explosive or energetic material and in a sealed container (e.g., a dispensing syringe) to a bridge wire initiator for use over a relatively large temperature range in which the method involves a slurry mixture that is relatively safer for a user to handle and in which the method is relatively less complex and shorter in duration for a user to prepare and apply the slurry mixture to the bridge wire initiator.

BRIEF DESCRIPTION

According to embodiments, a method for preparing and applying a slurry mixture to a bridge wire initiator involves a slurry mixture that is relatively safer for a user to handle and in which the method is relatively less complex and shorter in duration for a user to prepare and apply the slurry mixture to the bridge wire initiator.

According to embodiments, a method of forming an initiator is provided. The method includes placing an energetic powder in a container. Solvent is added to the container and mixing the solvent and energetic powder to form a slurry mixture. The slurry mixture is filtered. The filtered slurry mixture is placed in a transfer tube. The slurry mixture is applied to a bridge wire. The slurry mixture applied to the bridge wire is then dried.

According to embodiments, a system for applying a slurry mixture to a bridge wire of an initiator is provided. The system includes a container sized to receive an energetic powder and solvent. A mixer is operably coupled to the container to mix the energetic powder and solvent to form a slurry mixture. A screen is disposed to receive the slurry mixture from the mixer. A transfer tube is operably disposed to receive the slurry mixture from the screen. A needle is operably coupled to the transfer tube, the needle having an end a predetermined distance from the bridge wire.

According to embodiments, a method of forming an initiator is provided. The method includes placing an energetic powder in a container. A solvent is added to the container. A first mixing of the solvent and energetic powder is performed to form a slurry mixture. A second mixing of the slurry mixture is performed with a gyrating-type mixer. The slurry mixture from the second mixing is filtered. The viscosity of the filtered slurry mixture is determined. The viscosity of the filtered slurry mixture is adjusted when the viscosity is less than 300 cP or more than 800 cP. A portion of the filtered slurry mixture is placed in a dispensing syringe. The portion of the slurry mixture is applied to a bridge wire. The slurry mixture applied to the bridge wire is then dried.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Figure 1:
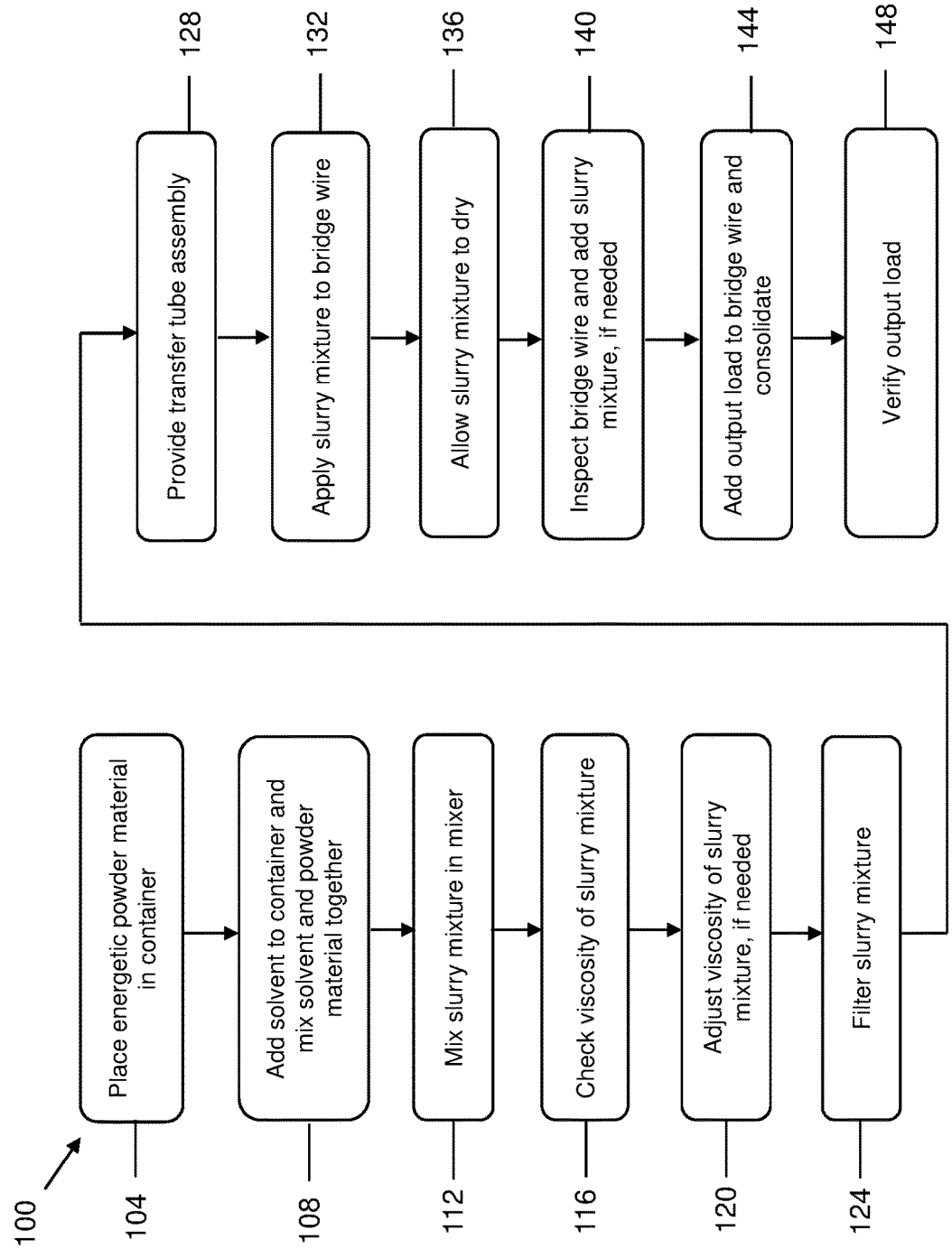
FIG. 1 is a flow diagram of a method for preparing a slurry mixture and applying the slurry mixture to a bridge wire type of initiator according to embodiments of the present invention.
Figure 2:
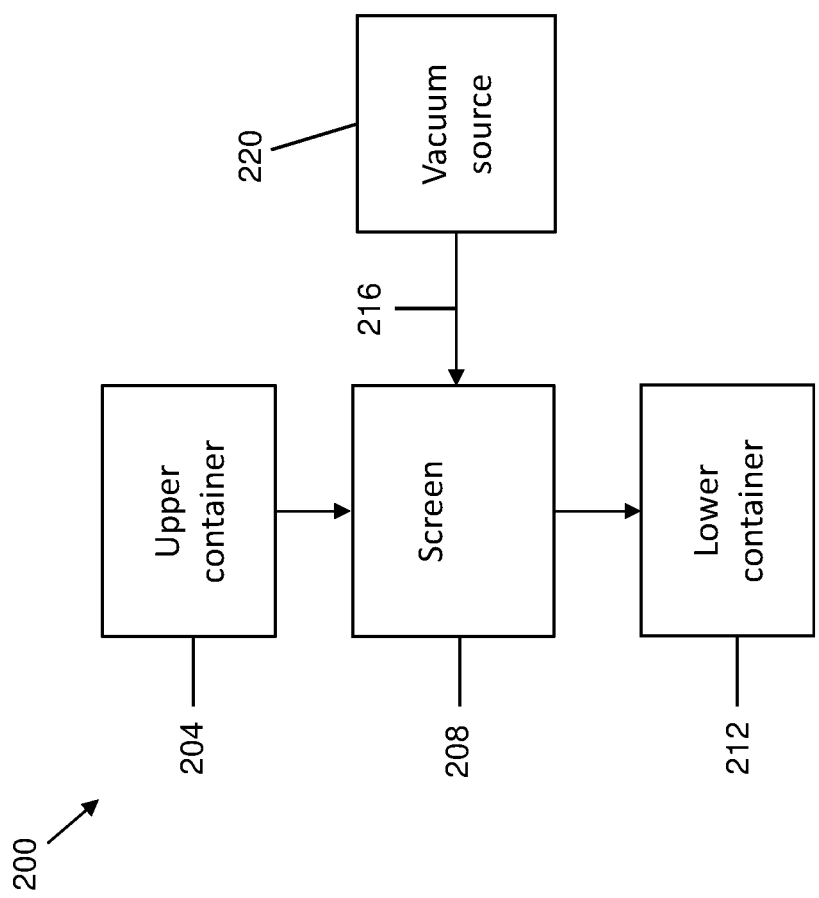
FIG. 2 is a block diagram of apparatus for preparing a slurry mixture using the method of the flow diagram of FIG. 1 according to embodiments of the present invention.
Figure 3:
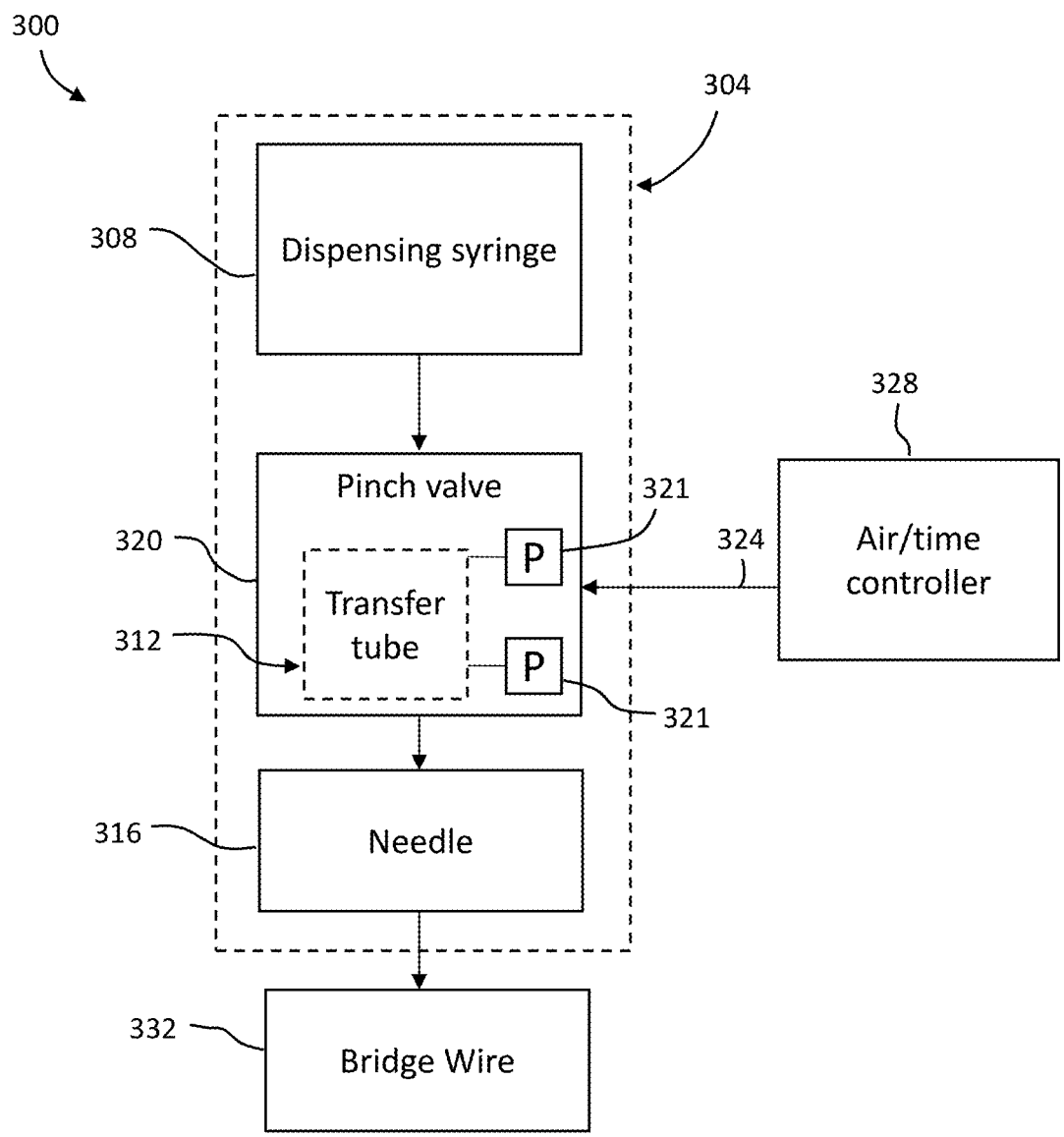
FIG. 3 is a block diagram of apparatus for preparing a slurry mixture and applying the slurry mixture to a bridge wire type of initiator using the method of the flow diagram of FIG. 1 according to embodiments of the present invention.

Referring to FIG. 1, there illustrated is a flow diagram of a method 100 for preparing a slurry mixture and applying the slurry mixture to a bridge wire type of initiator according to embodiments of the present invention. Referring also to FIGS. 2 and 3, there illustrated are block diagrams of apparatus 200, 300 for preparing a slurry mixture and applying the slurry mixture to a bridge wire type of initiator using the method 100 of the flow diagram of FIG. 1, according to embodiments of the present invention.

In an operation 104, an amount (e.g., 50 grams) of an energetic or explosive (e.g., pyrotechnic) material in dry or powder form is placed in a container. The container may be a common open mixing container such as a plastic container. The energetic material may comprise zirconium potassium perchlorate (ZPP) or other suitable energetic material typically comprising a fuel (e.g., zirconium) and an oxidizer (e.g., potassium perchlorate) mixed together with a binder. Other suitable energetic materials include, for example and without limitation, zirconium hydride potassium perchlorate (ZHPP), boron potassium nitrate (BPN), aluminum potassium perchlorate (APP), titanium potassium perchlorate (TPP), titanium hydride potassium perchlorate (THPP), and various intermetallic materials such as titanium boron, nickel aluminum, and palladium aluminum.

In an operation 108, an amount of solvent is added to the energetic powder material in the container. The amount of added solvent is such that it submerges or wets all of the dry powder material. The solvent may comprise butyl acetate, acetone, or other suitable liquid solvent capable of dissolving the binder. In embodiments of the present invention, the solvent utilized may have a relatively high vapor pressure, which allows for a relatively longer drying time of the solvent in the resulting powder—solvent mixture. This is desirable from the standpoint that the resulting slurry mixture should not be allowed to dry out too soon, else risk a potentially dangerous premature detonation or explosion of the slurry mixture.

As part of the operation 108, the powder—solvent mixture in the container may be stirred or mixed by hand using, e.g., a spatula, to ensure that all of the powder has been mixed with the solvent (i.e., no dry pockets exist in the powder—solvent mixture). This powder—solvent mixture may be referred to at this point in the method as the slurry mixture, which by nature is the suspension of the solid energetic powder material in the liquid solvent. Typically, it is desired that the slurry mixture be of relatively high density in terms of the amount of energetic powder in the slurry mixture.

In an operation 112, the slurry mixture is placed (poured) into a container that is part of a gyrating-type mixer (e.g., a paint shaker) and is mixed for approximately 7-10 minutes. This is done to better mix together the powder—solvent/binder slurry mixture. In the alternative, the container with the slurry mixture from the operation 108 may be placed into the mixer and the slurry mixture mixed together.

In an operation 116, a relatively small portion or sample (e.g., 2 cc) of the slurry mixture is removed from the container in the mixer using, e.g., a syringe. The sample in the syringe is then applied to or placed in a viscometer (e.g., a Brookfield viscometer). This is done to check the viscosity of the slurry mixture. In embodiments of the present invention for use with the aforementioned ZPP energetic material, the viscosity of the slurry mixture may be checked in the operation 116 as to whether or not it is in a range of from 300 cP (i.e., centipoise) to 800 cP. Other exemplary threshold upper and/or lower values for the viscosity of the slurry mixture may be used. In the alternative, the viscosity may be checked in the operation 116 to simply see if it is either above or below a certain predetermined or selected threshold viscosity value.

If the viscosity of the slurry mixture is either less than 300 cP (i.e., the lower threshold value) or greater than 800 cP (i.e., the upper threshold value), the viscosity of the slurry mixture may be controlled (i.e., adjusted) in an operation 120. For example, if the viscosity of the slurry mixture is less than 300 cP, the entire slurry mixture in the container may be removed from the mixer and exposed to the ambient air in the surrounding area in which the method 100 of embodiments of the present invention is being carried out. As an example, the container with the slurry mixture may be placed under a vent fan which flows air to the slurry mixture. This allows some of the solvent to vent out or otherwise be removed from the slurry mixture. During this operation 120, another small sample of the slurry mixture may be removed with a syringe and tested for viscosity after a period of time for venting has taken place. This operation 120 may be repeated as necessary until the viscosity of the slurry mixture is above a certain desired amount (e.g., greater than 300 cP). In some embodiments, slurries with viscosity higher than 800 cP may not flow well to migrate under/around, and to wet the surface of the bridgewire. Slurries with viscosity lower than 300 cP, will settle fast not allowing for work/application time for a batch of units.

On the other hand, if the viscosity of the slurry mixture is greater than 800 cP, additional solvent may be added to the slurry mixture. The viscosity of the slurry mixture may then be re-checked or tested again using a sample of the slurry mixture taken with a syringe and through use of the viscometer. This operation 120 may be repeated as necessary until the viscosity of the slurry mixture is below a certain desired amount (e.g., less than 800 cP).

Referring also to the apparatus 200 of FIG. 2, in an operation 124, the container 204 with the slurry mixture is removed from the mixer and the slurry mixture is allowed to pass from the container 204 through an in-line screen 208 (e.g., a 150×150 mesh screen), and then be re-captured or placed into a second container 212. This screening or filtering ("degassing") operation 124 may be performed where the force of gravity assists in removing the slurry mixture from its original container 204 located in an upper position, passing it down through the screen 208 located below the upper container 204, and flowing it down into the second or lower container 212 located below the screen 208. This screening or filtering operation 124 eliminates or significantly reduces the risk of having agglomerates or non-homogeneities result in the slurry mixture. Such agglomerates or non-homogeneities in the slurry mixture can have negative effects on the operation of the resulting bridge wire initiator. A vacuum air pressure provided in an air tube or hose 216 by a vacuum source 220 may be applied to the screen 208 to aid in the screening operation 124 (i.e., to assist in flowing the slurry mixture out of the upper container 204, down through the screen 208, and into the lower container 212). This screening operation 124 may last for approximately 5-10 minutes per slurry mixture in the upper container 204 (i.e., per "batch").

Referring also to the apparatus 300 of FIG. 3, in an operation 128, the slurry mixture may be transferred from the lower container into a transfer tube assembly 304 that, according to embodiments of the present invention, may comprise a dispensing syringe 308, a transfer tube 312 attached at one end to the dispensing syringe 308, and a needle 316 (e.g., an 18 gage needle) or dispensing tip attached to the other end of the transfer tube 312. Specifically, the slurry mixture may be transferred from the lower container to the closed container type dispensing syringe 308, which functions as the material reservoir for the slurry mixture. By using a closed container dispensing syringe 308, the aforementioned issues that arise from use of the slurry mixture within an open container are mitigated. Also, the closed container dispensing syringe 308 has the additional benefit of maintaining or preserving the viscosity of the slurry mixture for a longer period of time, as compared to an open container. In addition, the slurry mixture in the dispensing syringe 308 is under pressure, which prevents the heavy particles (e.g., Zirconium) from settling and creating unfavorable conditions for firing reliability (i.e., the local ratio of fuel to oxidizer will change at the bridge wire interface).

Further, the transfer tube assembly 304 may be attached to an air-operated dispense pinch valve 320. More specifically, the transfer tube portion 312 of the transfer tube assembly 304 may comprise round tubing that passes through a tube support section within the body of the pinch valve 320. The round tubing may be of a specific diameter (e.g., 0.25 inches), and may comprise polyethane, PVC, silicone, or other suitable material. In a vertical arrangement of the various components or the transfer tube assembly 304, the dispensing syringe 308 is on top of the body of the pinch valve 320 and the needle or dispensing tip 316 is on the bottom of the body of the pinch valve 320.

In an embodiment of the present invention, the pinch valve 320 may comprise the Model 826 disposable fluid path pinch valve provided by Dymax Corporation. This valve 320 is a pneumatically-operated, normally closed pinch valve that controls the dispensing of a relatively wide variety of materials from the dispensing syringe 308, through the transfer tube 312, and out of the needle or dispense tip 316. Also, this pinch valve 320 is specifically designed to dispense relatively thicker materials (such as the slurry mixture of embodiments of the present invention) with relative ease and high precision. Fluids are sealed within the fluid path to prevent contamination, and the fluid path is disposable and replaceable. In embodiments of the present invention, the fluid path comprises the transfer tube portion 312 of the transfer tube assembly 304.

A flow of air may be provided to the pinch valve 320 through an air tube or hose 324 connected on one end with the pinch valve 320 and on the other end with an air or time controller 328. In an embodiment of the present invention, the air or time controller 328 may comprise the Model DVC-845 Digital Valve Controller also provided by Dymax Corporation. This electronic controller 328 controls the flow of air through the air tube or hose 324 to the pinch valve 320 to thereby control the movement of a pair of pistons 321 within the pinch valve 320. The pistons 321 pinch the transfer tube 312 at two different locations along its length and within the body of the pinch valve 320. When the transfer tube 312 is pinched, the flow of the slurry mixture through the transfer tube 312 is restricted to a degree. In contrast, when the transfer tube 312 is not pinched, or is released, the flow of the slurry mixture through the transfer tube 312 is not restricted to any degree. Thus, by selectively pinching and releasing the transfer tube 312 at two locations along the length of the transfer tube 312, the flow of the slurry mixture from the dispensing syringe 308 to the needle or dispense tip 316 is controlled with relative high precision.

In an operation 132, an air flow having a pressure of approximately 0.5-2.0 atmospheres may be selectively applied at the proper points in time from the air or time controller 328 through the air tube or hose 324 to the pinch valve 320. As mentioned, this air flow controls the pistons 321 within the pinch valve 320, thereby controlling the amount of the slurry mixture dispensed from the needle or dispense tip 316 and onto the bridge wire 332, according to embodiments of the present invention. Thus, the air or time controller 328 controls the dispense time of the slurry mixture pinch valve 320, thereby controlling the amount of the slurry mixture applied to the bridge wire 332.

In this operation 132 and according to embodiments of the present invention, the slurry mixture in an amount in a range of from 0.5 mg to 3.0 mg (e.g., 1.0 mg) may be dispensed at a high rate from the needle or dispense tip 316 onto the bridge wire 332 at a distance of approximately one-quarter inch to one-sixteenth inch from the needle 316 to the bridge wire 332. In some embodiments, high dispense rate (application of slurry) is desirable to ensure migration of the slurry under the bridge wire, and separates the solids from solvent (the solids will settle, while the solvent is forced to the surface), ensuring a reduced or minimal void creation around the bridge wire during drying process. The bridge wire 332 may be held in place, for example, using a fixture at the selected distance from the output of the needle or dispense tip 316. According to embodiments of the present invention, multiple dispenses of the slurry mixture (in similar amounts of 0.5 mg-3.0 mg) onto the bridge wire 332 may be needed to entirely and properly cover or coat the bridge wire 332 with the slurry mixture.

In an operation 136, after each coat or dispensing of the slurry mixture onto the bridge wire 332 in the operation 132, the slurry mixture is allowed to air dry for approximately two hours or until the slurry mixture is sufficiently dry. Then, in an operation 140, the dried coating of the slurry mixture on the bridge wire is visually inspected for any incomplete areas of the coating of the slurry mixture on the bridge wire (e.g., for any voids under the bridge wire). The visual inspection may be performed using a microscope. If an incomplete application of the slurry mixture on the bridge wire is discovered by way of the visual inspection operation 140, then one or more additional slurry coatings are added to the bridge wire in one or more corresponding iterations of the operation 132 as necessary until the bridge wire is fully covered with the slurry mixture.

In an operation 144, an amount of energetic or explosive powder (e.g., ZPP) is placed or disposed on the outer surface of the dried slurry mixture, which is on the bridge wire 332. This amount of energetic or explosive powder represents an output load. The powder is consolidated to obtain the desired bridge wire-to-slurry interface.

In an operation 148, the output load is verified using, e.g., a thermal transfer test (TTT), based on "ALL-FIRE/NO-FIRE" procedures of the resulting bridge wire initiator. Measuring the TTT (or resistance of the bridge wire 332) during the consolidation operation 144 essentially comprises a closed circuit loop that provides an indication of the health of the bridge wire initiator in real time (i.e., how well the bridge wire 332 is covered by the slurry mixture), thereby reducing or eliminating the risk of process variation.

Embodiments of the present invention improve the reliability of the overall slurry mixture preparation and application process. All of the aforementioned method operations (except the visual inspection operations) are measureable and controlled as they occur.

Embodiments of the present invention also provide for reduced cost, as compared to known methods. The slurry mixture preparation and application method 100 according to embodiments of the present invention is far less complicated and shorter in time from start to completion than traditional bridge wire painting technique, thereby reducing operation cost and increasing the gross margin. The dispensing method is automatic and only takes 5-10 seconds per part, compared with other methods where it takes up to one hour per part. Also, the dispensing method allows for no rejects; that is, all processed parts (e.g., bridge wires 332) conform to specification since there is a provision for inspection in every operation. Further, in known methods, a significant amount of cost is the indirect cost of failures and failure investigation. In contrast, the method 100 of embodiments of the present invention greatly reduces the risk of failures by implementing controls at each operation. In known slurry preparation and application methods, all components are typically built before acceptance testing is performed, thereby risking major failures that could be prevented during the bridge wire manufacturing operations.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A system for applying a slurry mixture to a bridge wire of an initiator, the system comprising:
    a container sized to receive an energetic powder and solvent;
    a mixer operably coupled to the container to mix the energetic powder and solvent to form a slurry mixture;
    a screen disposed to receive the slurry mixture from the mixer;
    a transfer tube operably disposed to receive the slurry mixture from the screen; and
    a needle operably coupled to the transfer tube, the needle having an end a predetermined distance from the bridge wire.

2. The system of claim 1, further comprising a pinch valve coupled to the transfer tube, and an air source operably coupled to actuate the pinch valve.

3. The system of claim 2, wherein the pinch valve includes a pair of pistons that are positioned at two different locations along a length of the transfer tube.

4. The system of claim 2, wherein the transfer tube is a dispensing syringe.

5. The system of claim 4, further comprising a vacuum source operably coupled to apply vacuum air pressure to the screen.

6. The system of claim 1, wherein the predetermined distance is between one-sixteenth and one-quarter inch.

7. The system of claim 1, wherein the slurry mixture has a viscosity of 300-800 Centipoise.

8. The system of claim 2, wherein the dispensing syringe includes a reservoir arranged to receive the slurry mixture from the transfer tube.

* * * * *